US012620758B2

(12) United States Patent
Sasaki et al.

(10) Patent No.: US 12,620,758 B2
(45) Date of Patent: May 5, 2026

(54) FIXING STRUCTURE

(71) Applicant: Yazaki Corporation, Tokyo (JP)

(72) Inventors: Yasuhiro Sasaki, Makinohara (JP); Jun Ishikawa, Tokyo (JP); Yuki Noro, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 363 days.

(21) Appl. No.: 18/503,670

(22) Filed: Nov. 7, 2023

(65) Prior Publication Data

US 2024/0154360 A1 May 9, 2024

(30) Foreign Application Priority Data

Nov. 8, 2022 (JP) ................................ 2022-178748

(51) Int. Cl.
*H01R 13/62* (2006.01)
*H01R 13/629* (2006.01)

(52) U.S. Cl.
CPC .............................. *H01R 13/62933* (2013.01)

(58) Field of Classification Search
CPC ........ H01R 13/62933; H01R 13/62938; H01R 13/62955; H01R 13/62988
USPC .................................................. 439/157, 373
See application file for complete search history.

(56) References Cited

U.S. PATENT DOCUMENTS

| | | | | |
|---|---|---|---|---|
| 5,829,994 | A | 11/1998 | Oda et al. | |
| 10,014,628 | B2 * | 7/2018 | Mito | H01R 13/4538 |
| 10,826,238 | B2 * | 11/2020 | Ochiai | H01R 13/62927 |
| 11,189,956 | B2 * | 11/2021 | Tanimura | H01R 13/5202 |
| 11,211,752 | B2 * | 12/2021 | Ohtaka | H01R 13/641 |
| 11,682,503 | B2 * | 6/2023 | Aoshima | H01B 17/66 174/37 |
| 12,308,569 | B2 * | 5/2025 | Takashima | H01R 13/62955 |
| 2015/0111441 | A1 | 4/2015 | Suzuki et al. | |

FOREIGN PATENT DOCUMENTS

| | | |
|---|---|---|
| JP | 2002-289303 A | 10/2002 |
| JP | 2010-113914 A | 5/2010 |

* cited by examiner

*Primary Examiner* — Phuong K Dinh
(74) *Attorney, Agent, or Firm* — Sughrue Mion, PLLC

(57) ABSTRACT

A connector includes a housing with a latching lock and a lever latch section which is independent from the latching lock. A partner connector includes a partner housing with a lock section which is latchable by the latching lock. The lever is changeable between a non-latched state and a latched state, wherein when changing the lever from the non-latched state to the latched state, the lever connects the connector to the partner connector so as to cause the connector and the partner connector to approach each other in a forward-rearward direction. The connector is configured to be fixed to the partner connector by the lever being brought into the latched state and by the lock section being brought into a state in which the lock section is latched by the latching lock.

3 Claims, 10 Drawing Sheets

FIXING STRUCTURE

BACKGROUND OF THE INVENTION

Technical Field

The present invention relates to a fixing structure.

Background Art

Conventionally, a lever-operated connector is disclosed which includes a housing main body for accommodating a terminal metal part, a hood section for covering the housing main body, and a lever (see e.g. Patent Document 1). A lever-operated connector according to Patent Document 1 is provided such that an engagement protrusion of the lever connects the connector to a partner connector intended to be fixed to the connector, wherein when rotating the lever in this state, the housing main body and hood section are moved toward the partner connector. In this manner, the connector and partner connector are fixed to each other. The rotated lever is then latched to a lever lock arm provided at the housing main body.

CITATION LIST

Patent Literature

Patent Document 1: JP 2010-113914 A

SUMMARY OF THE INVENTION

The above-mentioned connector is configured such that a fixed state of the connector to the partner connector is maintained by latching the lever with the lever lock arm and by thus disenabling change of a pose of the lever temporarily. In this case, when a dimension of the lever and/or lever lock arm varies largely, it may cause assembling instability between the lever and lever lock arm, which makes it difficult to maintain the fixed state of the connector to the partner connector stably. Furthermore, rotation of the lever is often operated directly by a hand. In this case, a portion of the lever to be latched by the lever lock arm may be touched by a hand of an operator unintendedly since an operated portion of the lever exists in a same position as the portion to be latched by the lever lock arm. This may then cause various problems, for example it may be difficult to latch the lever to the lever lock arm smoothly, or a partially latched state may be established in which the lever is insufficiently latched to the lever lock arm. Therefore, it may be possible that a correct contact state between terminals of the connector and the partner connector is not maintained.

An objective of the present invention is to provide a fixing structure which enables a correct contact state between terminals of the connector and the partner connector to be maintained stably.

In order to achieve the above-mentioned object, a fixing structure includes: a connector; a partner connector configured to be connected to the connector; and a lever interposed between the connector and the partner connector, wherein the connector includes a housing having a tubular shape which is open along a fixing direction, the connector and the partner connector being configured to approach each other in the fixing direction, wherein the housing includes a latching lock and a lever latch section, the latching lock protruding in an intersection direction intersecting the fixing direction, the lever latch section being independent from the latching lock and configured to latch the lever, wherein the partner connector includes a partner housing configured to be mated with the housing, wherein the partner housing includes a lock section which is latchable by the latching lock, wherein the lever is changeable between a non-latched state and a latched state, wherein in the non-latched state, the lever is configured not to be latched by the lever latch section, and in the latched state, the lever is configured to be latched by the lever latch section, wherein when changing the lever from the non-latched state to the latched state, the lever connects the connector to the partner connector so as to cause the connector and the partner connector to approach each other in the fixing direction, wherein the connector is configured to be fixed to the partner connector by the lever being brought into the latched state and by the lock section being brought into a state in which the lock section is latched by the latching lock.

The present invention enables a fixing structure to be provided which allows a correct contact state between terminals of the connector and the partner connector to be maintained stably.

DETAILED DESCRIPTION OF PREFERRED EMBODIMENTS

Figure 1:
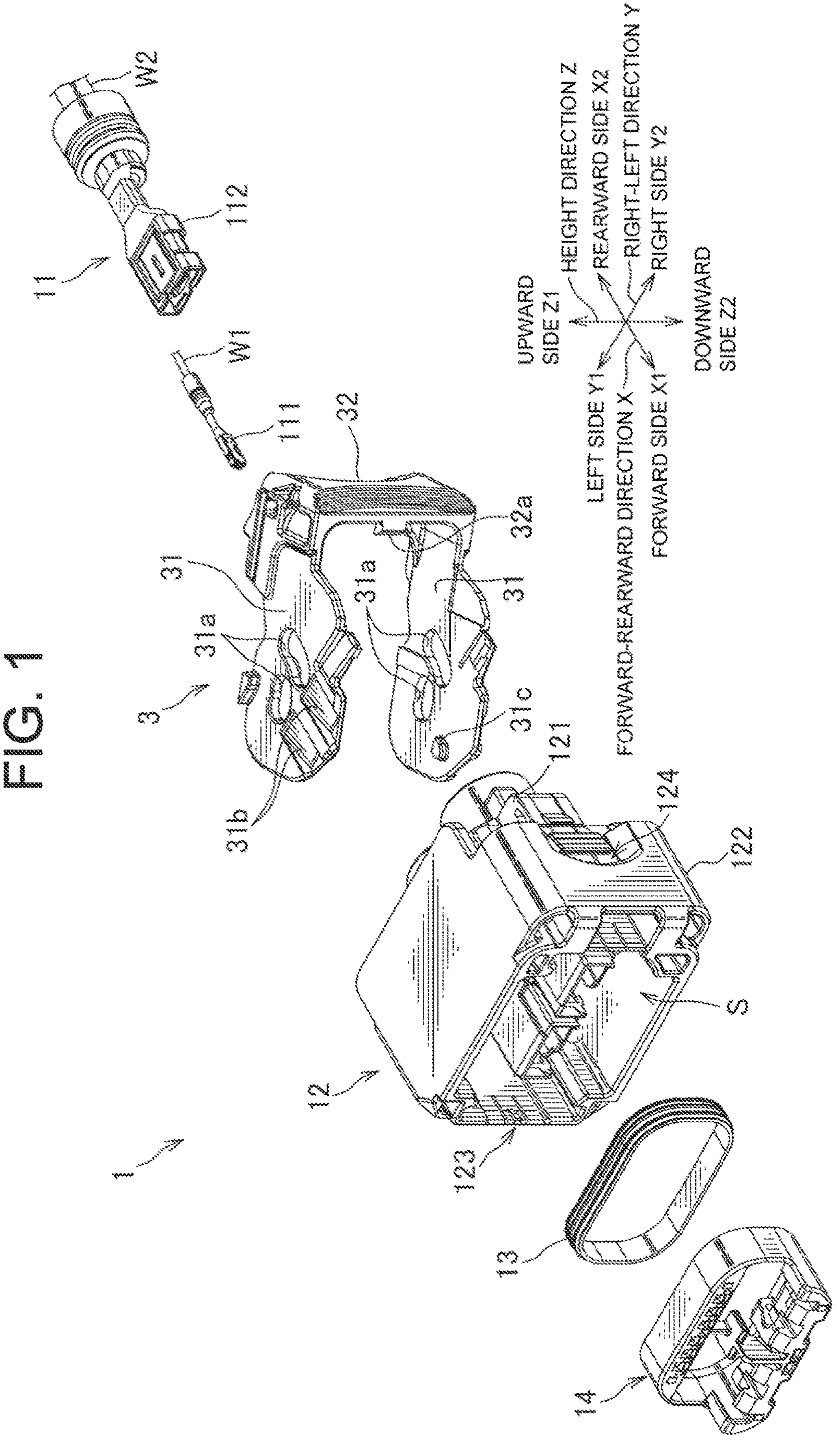
FIG. 1 shows an exploded perspective view of a connector which forms part of a fixing structure according to an embodiment of the present invention.

Hereinafter, a fixing structure will be described. The fixing structure includes a connector 1, a partner connector 2 to be connected to the connector 1, and a lever 3, wherein the connector 1 and partner connector 2 are configured to be fixed to each other via the lever 3.

In the FIGURES, directions X, Y and Z extend orthogonally to each other. Furthermore, a forward-rearward direction shall be defined as a fixing direction and referred to as "forward-rearward direction X", wherein in the fixing direction, the connector 1 and the partner connector 2 approach each other. Moreover, one side and another side along the forward-rearward direction X shall be referred to as "forward side X1" and "rearward side X2", respectively. The forward-rearward direction X is also a forward-rearward direction of a housing 12 and a partner housing 21 as described below.

A right-left direction shall be defined as an intersection direction intersecting the fixing direction (a width direction of the housing 12 and partner housing 21) and shall be referred to as "right-left direction Y". Furthermore, one side and another side along the right-left direction Y shall be referred to as "left side Y1" and "right side Y2", respectively. A height direction shall be defined as an upward-downward direction of the housing 12 and partner housing 21 and shall be referred to as "height direction Z". Furthermore, one side and another side along the height direction Z shall be referred to as "upward side Z1" and "downward side Z2", respectively. The above definition is intended merely for the sake of better explanation, and it is to be understood that the above-mentioned directions may not necessarily coincide with those during using the connector 1 and/or partner connector 2 in practice, and that the above-mentioned directions are not intended for limiting directions during use in practice.

The connector 1—which forms part of the fixing structure—is a female connector to be connected to a male connector as the partner connector 2 and includes a terminal 11, the housing 12, a seal 13, and a front holder 14, as shown in FIG. 1.

The terminal 11 is a female terminal formed from a conductive metal element and includes a first terminal 111 and a second terminal 112, as shown in FIG. 1. The first terminal 111 is formed in a polygonal tubular shape which has an opening with a substantially rectangular shape. The first terminal 111 is connected to an end of a first electric wire W1 on the forward side X1. The second terminal 112 is formed in a polygonal tubular shape which has an opening, wherein the opening has a substantially rectangular shape with a larger extension in the right-left direction Y. The second terminal 112 is connected to an end of a second electric wire W2 on the forward side X1, the second electric wire W2 having a larger diameter than the first electric wire W1.

Figure 2:
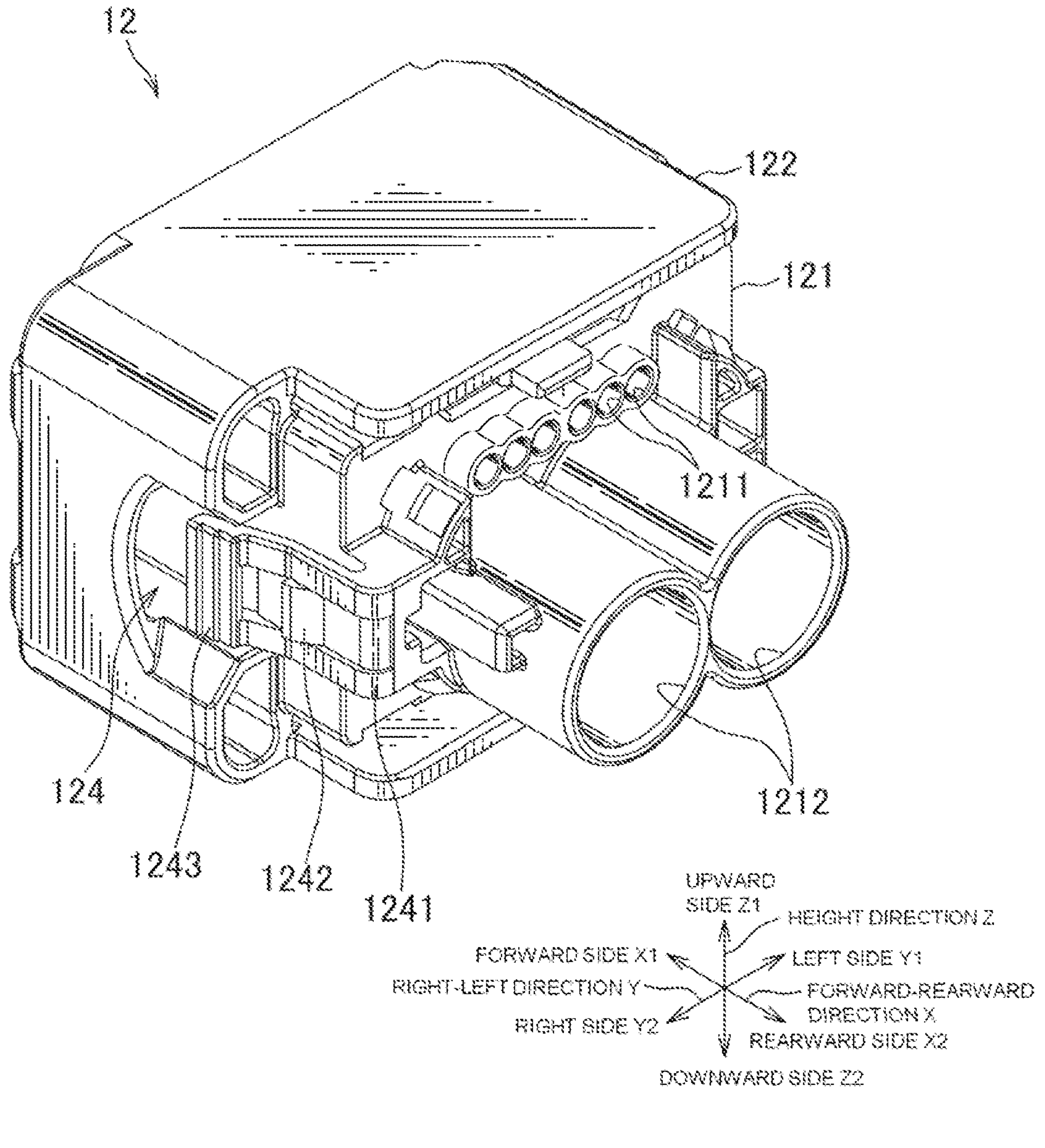
FIG. 2 shows a perspective view of a housing from a rear left side, wherein the housing forms a part of the connector.

The housing 12 is a substantially tubular element which is open along the forward-rearward direction X, wherein the substantially tubular element is configured for inserting the terminal 11 therein. The housing 12 includes a main body 121 and a hood section 122, as shown in FIG. 1. The main body 121 is formed in a box-shape extending along the forward-rearward direction X. As shown in FIG. 2, a first accommodating chamber 1211 and a second accommodating chamber 1212 are formed in the main body 121, the first accommodating chamber 1211 extending through the main body 121 in the forward-rearward direction X, wherein the second accommodating chamber 1212 is disposed on the downward side Z2 below the first accommodating chamber 1211 and extends through the main body 121 in the forward-rearward direction X. The first accommodating chamber 1211 is configured for inserting the first terminal 111 therein from the rearward side X2. The second accommodating chamber 1212 is configured for inserting the second terminal 112 therein from the rearward side X2.

Figure 3A:
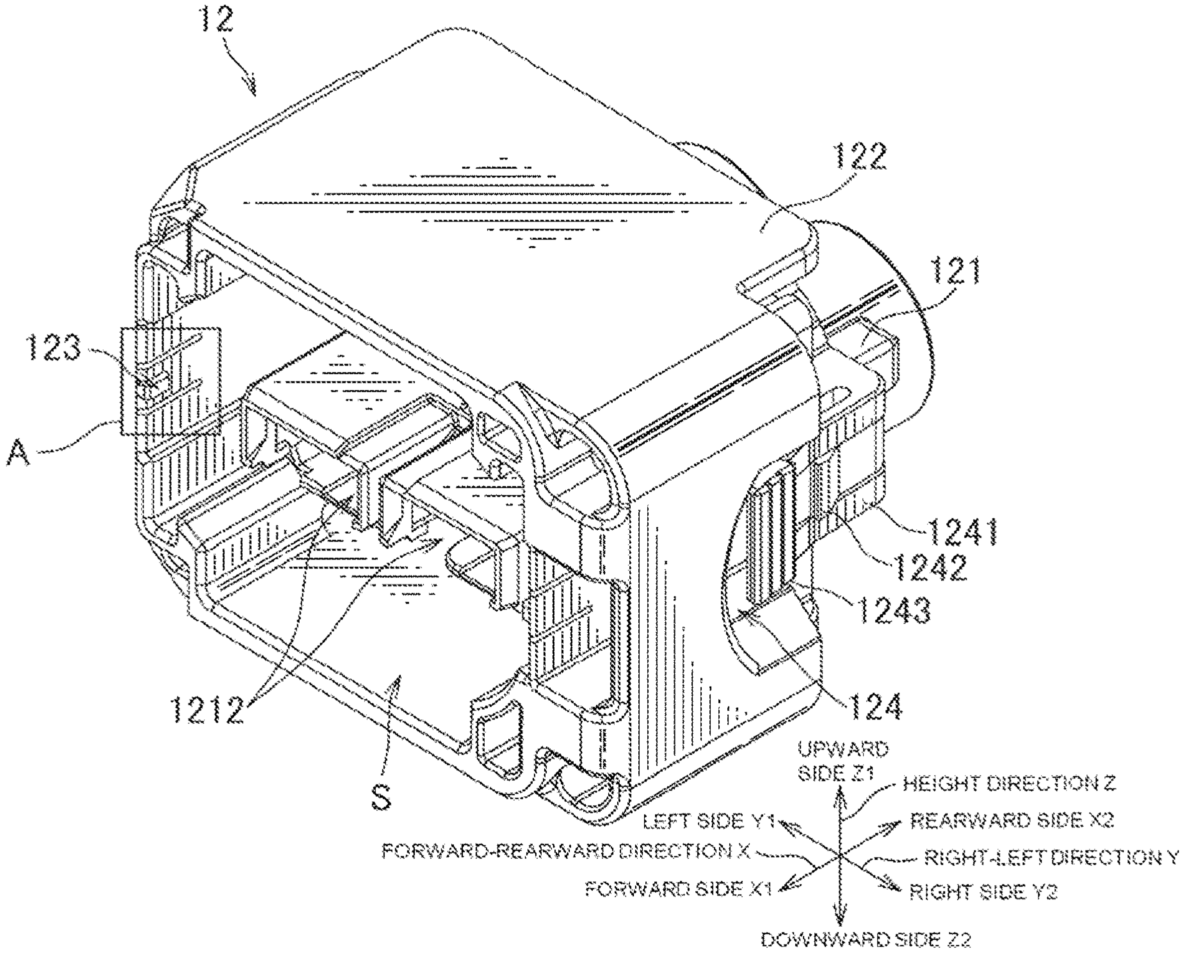
FIG. 3A shows a perspective view of the housing from right front.

The hood section 122 is provided so as to cover an outer circumferential surface of the main body 121. As shown in FIG. 2, an end of the hood section 122 on the rearward side X2 is integrated with an outer circumferential wall of the main body 121. As shown in FIG. 3, a portion of the hood section 122 on the forward side X1 surrounds the outer circumferential wall of the main body 121 with spacing between the portion of the hood section 122 and the outer circumferential wall in an inward-outward direction so that a mating space S is formed between the portion of the hood section 122 and the main body 121, wherein the mating space S is configured for mating the front holder 14 and partner connector 2 therewith.

Figure 3B:
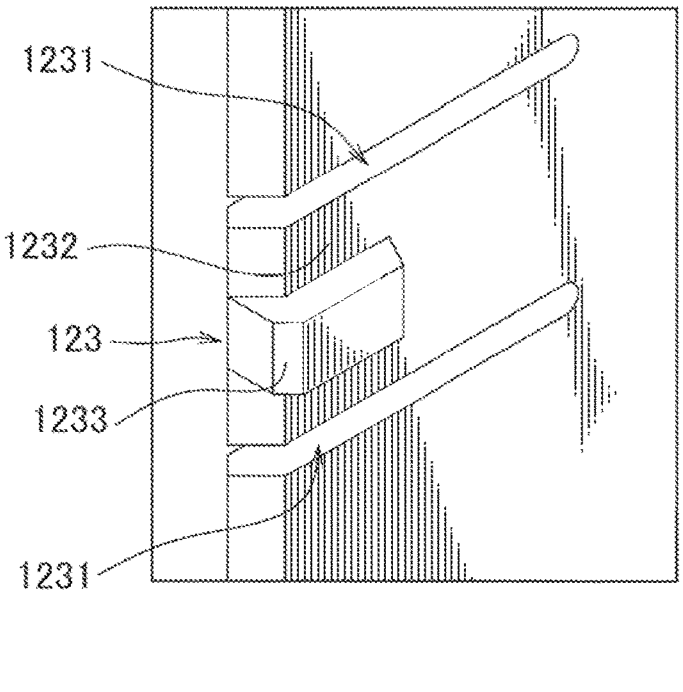
FIG. 3B shows a partial enlarged view of FIG. 3A in a region A.

The hood section 122 includes latching locks 123 on inner wall surfaces of both of right and left lateral walls of the hood section 122, wherein the latching locks 123 are configured to latch lock sections 211 on the partner housing 21 of the partner connector 2 as described below. As shown in FIG. 3B, each of the latching locks 123 includes a pair of indentations 1231, an elastic plate section 1232 and a ridged portion 1233, the pair of indentations 1231 being spaced from each other in the height direction Z, wherein the elastic plate section 1232 is interposed between the pair of indentations 1231, and the ridged portion 1233 is provided on an inner wall surface of the elastic plate section 1232. Each of the indentations 1231 extends along the forward-rearward direction X and is open on the forward side X1.

The elastic plate section 1232 is formed from a plate section interposed between the pair of indentations 1231 to be elastically deformable in the right-left direction Y from an end of the elastic plate section 1232 on the rearward side X2 as a fulcrum. This end of the elastic plate section 1232 on the rearward side X2 corresponds to a base end of the elastic plate section 1232. The ridged portion 1233 is formed so as to protrude from the inner wall surface of the elastic plate section 1232 in the right-left direction Y (intersection direction intersecting the fixing direction). The ridged portion 1233 is configured to be engaged with the lock section 211 as described below, wherein the ridged portion 1233 comes into contact with a face of the lock section 211 oriented toward the forward side X1 to limit displacement of the lock section 211 toward the forward side X1.

A lateral wall of the hood section 122 on the right side Y2 is partially cut out on the rearward side X2 as shown in FIG. 2, wherein a lever latch section 124 is exposed in this cut-out region. The lever latch section 124 is an elastic element formed on a lateral wall of the main body 121 on the right side Y2 and configured to latch the lever 3 attached to the housing 12.

Figure 5:
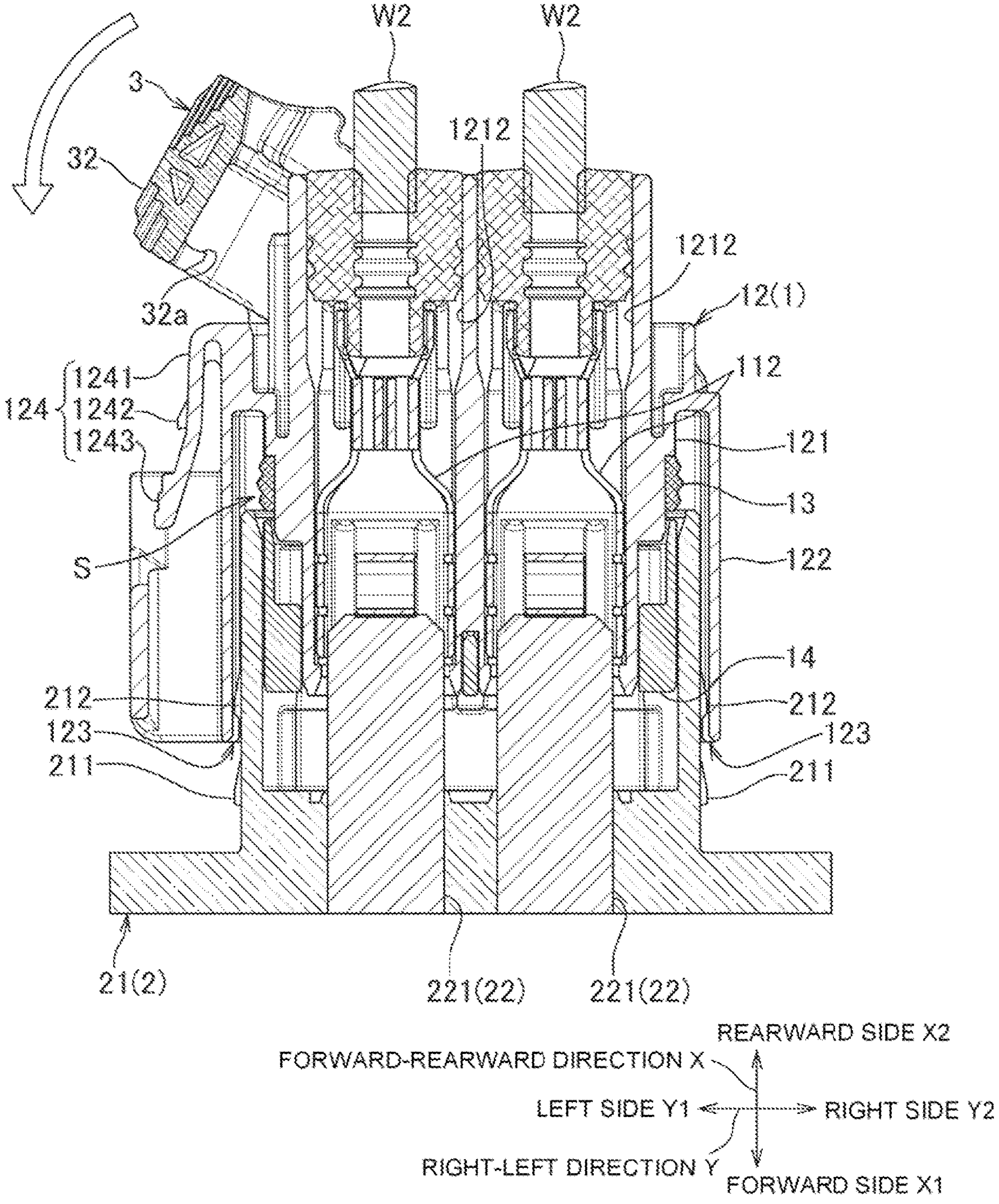
FIG. 5 shows a sectional view of the connector and partner connector in a temporary assembled state.

The lever latch section 124 is independent form the latching locks 123 as described above. The lever latch section 124 includes a base portion 1241, a claw portion 1242 and a finger application portion 1243, the base portion 1241 being configured to be connected to the end of the main body 121 on the rearward side X2, wherein the claw portion 1242 is formed in a middle of a plate-shaped portion standing from the base portion 1241 and extending toward the forward side X1, and wherein the finger application portion 1243 is disposed further toward the forward side X1 than the claw portion 1242. As shown in FIG. 5, a gap is formed in the right-left direction Y between the finger application portion 1243 and the main body 121. This allows the lever latch section 124 to be elastically deformed in the right-left direction Y from the base portion 1241 as the fulcrum by pressing the finger application portion 1243 inwardly in the right-left direction Y.

Figure 7:
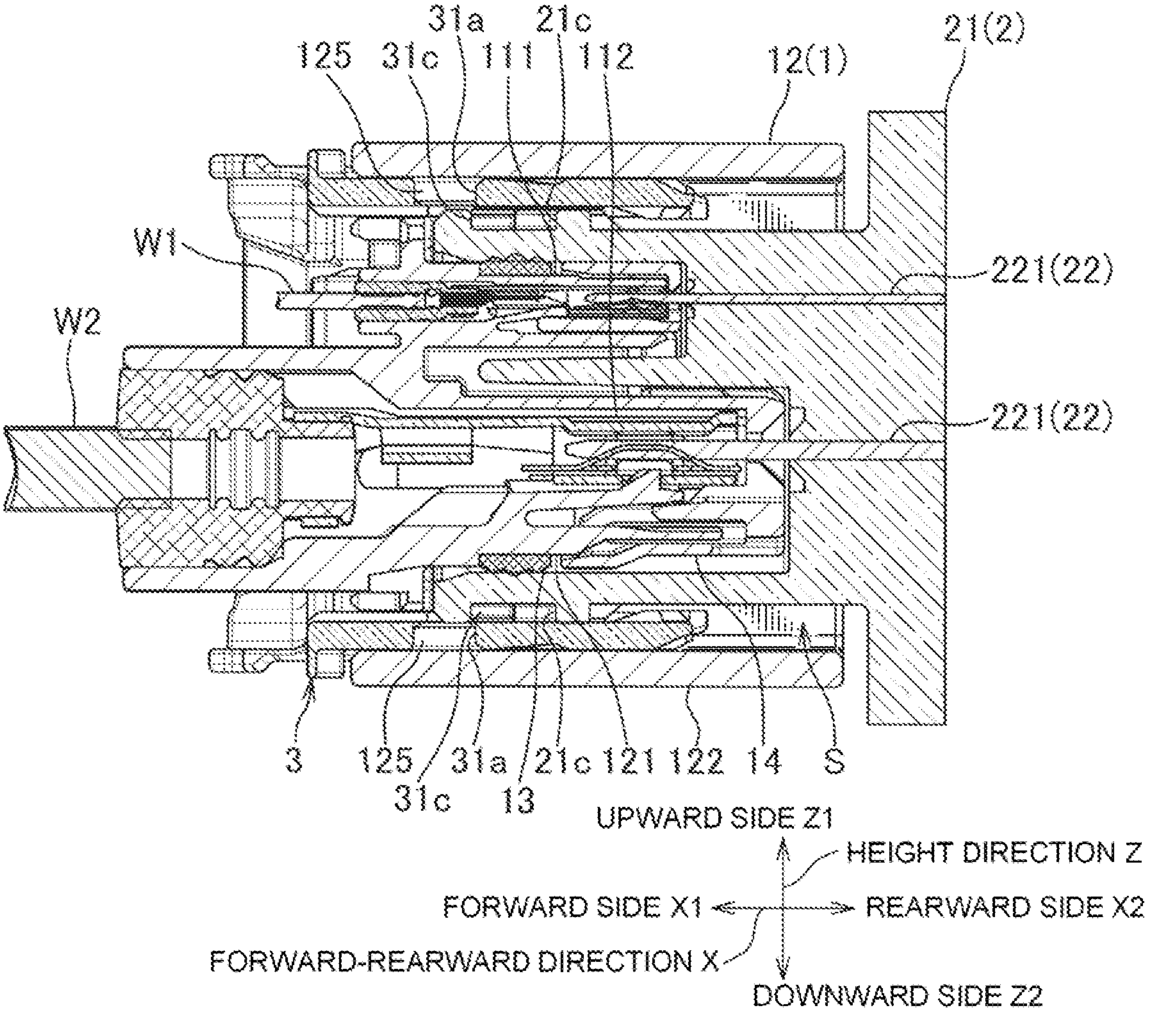
FIG. 7 shows a longitudinal sectional view of the connector and partner connector in the final assembled state.
Figure 10:
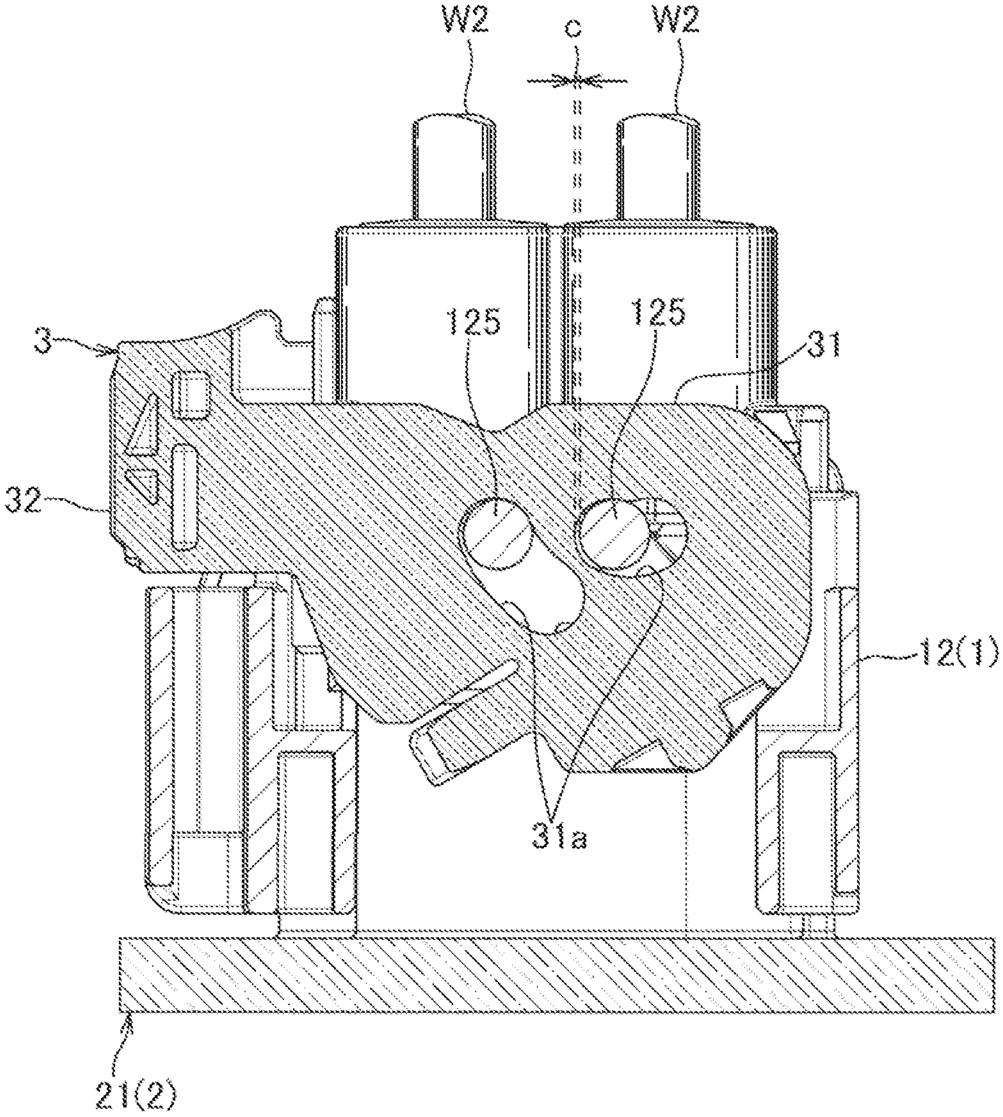
FIG. 10 shows a cross sectional view of the connector and partner connector in the final assembled state at a location where the lever is located.

Each of end inner wall surfaces of upper and lower walls of the hood section 122 on the forward side X1 includes bosses 125 formed thereon, which protrudes in the height direction Z (the bosses 125 are shown only in FIGS. 7 and 10). The bosses 125 are fitted into boss attachment holes 31*a* in the lever 3 as described below, wherein the lever 3 is connected to the housing 12 via the bosses 125.

As shown in FIG. 1, the seal 13 is formed in a substantially rectangular frame shape adapted to a shape of an outer circumference of the main body 121 of the housing 12. The seal 13 is fitted onto the housing 12 so as to surround the outer circumferential wall of the main body 121 as shown in FIGS. 5 to 8 so that the connector 1 according to the present embodiment is configured as a water-proof connector.

The front holder 14 has e.g. a function of positioning partner terminals 22 (male terminals) of the partner connector 2, and is formed in a substantially tubular shape which is mated with the main body 121 of the housing 12 from the forward side X1 toward the rearward side X2.

Figure 4A:
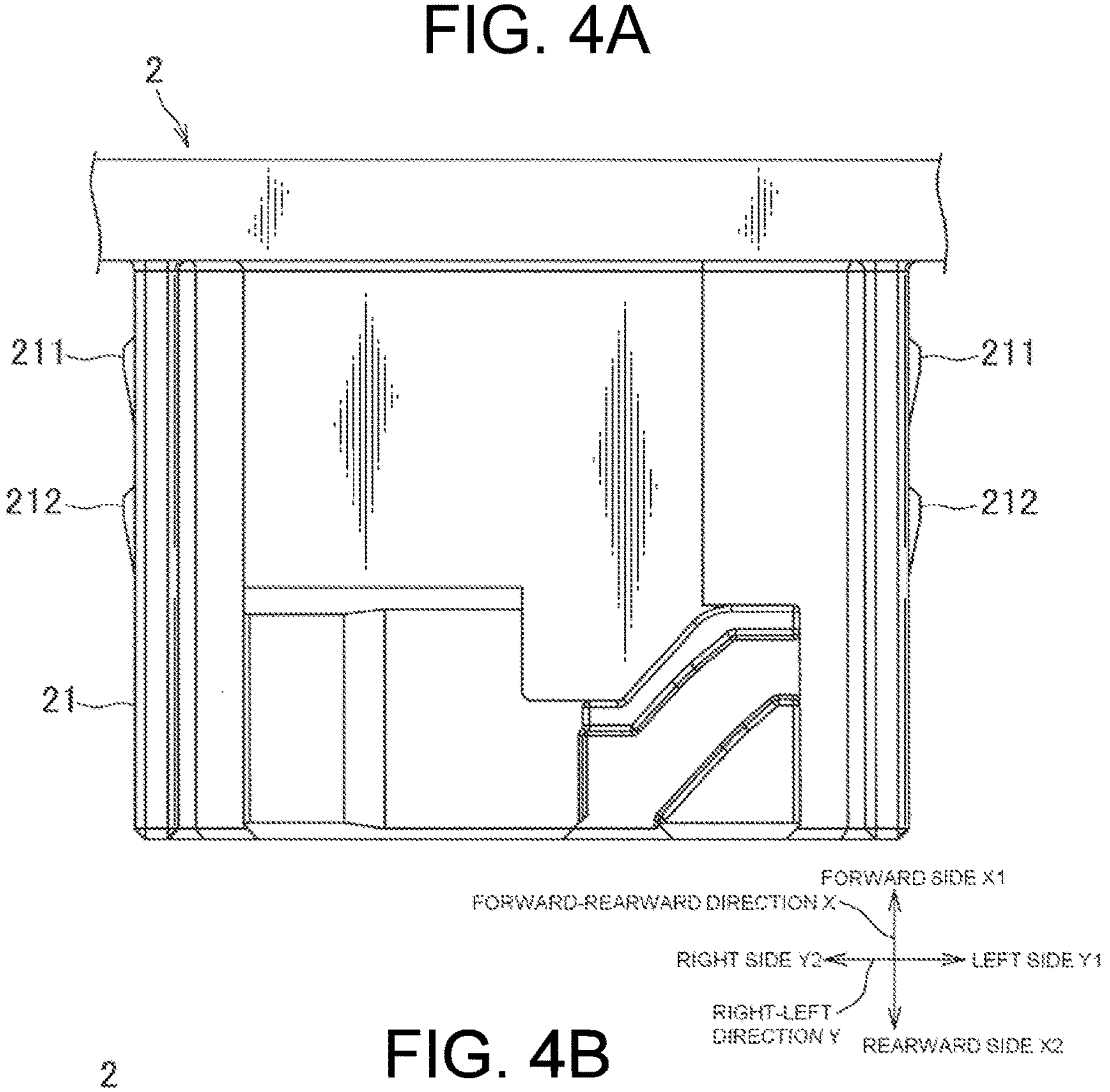
FIG. 4A shows a plan view of a partner connector from an upward side, wherein the partner connector is to be connected to the connector.
Figure 4B:
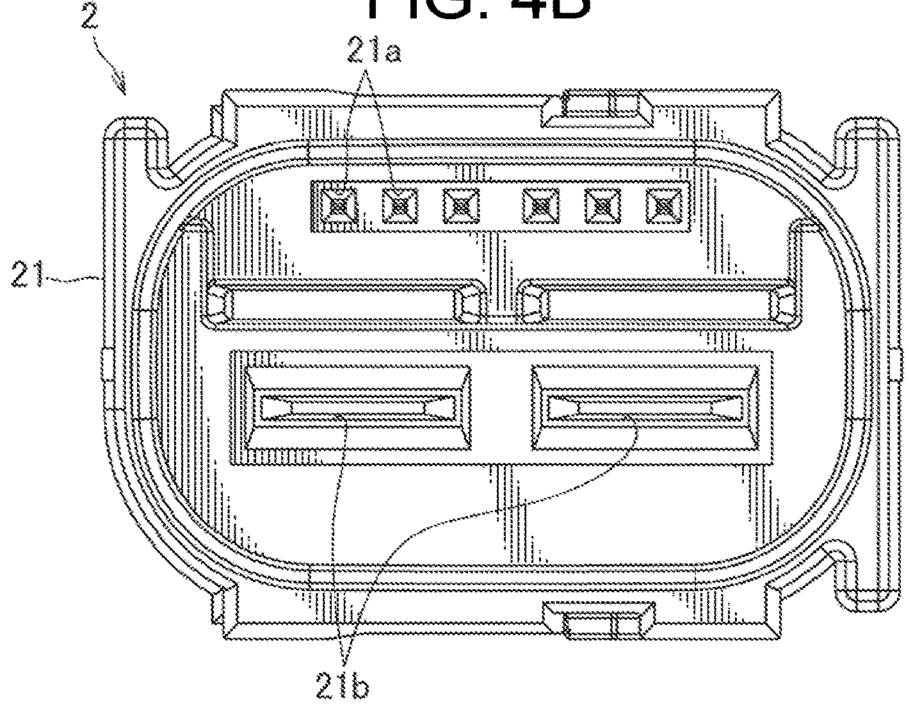
FIG. 4B shows a front view of the partner connector from a forward side.

As described above, the partner connector 2 is a male connector to be connected to the connector 1. This partner connector 2 includes the partner housing 21 in the form of a male housing as shown in FIG. 4A. The partner housing 21 is formed in a tubular shape which is open toward the rearward side X2, wherein the partner housing 21 is mated into the mating space S in the housing 12 of the connector 1. As shown in FIG. 4B, the housing includes first insertion holes 21*a* and second insertion holes 21*b* therein, the first insertion holes 21*a* extending through the housing in the forward-rearward direction X. As shown in FIG. 7, tabs 221 of partner terminals 22 (first male terminals) are inserted through the first insertion holes 21*a*, wherein the tabs 221 are configured to be connected to the first terminals 111 as described above. As shown in FIG. 7, tabs 221 of partner terminals 22 (second male terminals) are inserted through the second insertion holes 21*b*, wherein the tabs 221 are configured to be connected to the second terminals 112 as described above.

The partner housing 21 includes lock sections 211 and second lock sections 212 formed on both opposite lateral walls in the right-left direction Y, the lock sections 211 protruding outwardly in the right-left direction Y, wherein the second lock sections 212 are spaced from the lock sections 211 toward the rearward side X2 and protrude outwardly in the right-left direction Y. This means that a pair of lock sections 211 and a pair of second lock sections 212 are provided and spaced from each other in the forward-rearward direction X, wherein one of the pair of lock sections 211 and one of the pair of second lock sections 212 are formed on the left side Y1 of the partner housing 21, and another of the pair of lock sections 211 and another of the pair of second lock sections 212 are formed on the right side Y2 of the partner housing 21.

The lock sections 211 and second lock sections 212 are engaged with the above-described latching locks 123 of the housing 12, wherein when being engaged with the latching locks 123, displacement of the lock sections 211 and second lock sections 212 toward the forward side X1 is limited by the latching locks 123 respectively. This means that the lock sections 211 and second lock sections 212 are latched by the latching locks 123 respectively.

The partner housing 21 includes engagement recesses 21*c* formed in upper and lower walls, wherein the engagement recesses 21*c* are open outwardly in the height direction Z (shown only in FIG. 7). The engagement recesses 21*c* are configured for fitting engagement protrusions 31*c* of the lever 3 therein as described below, wherein the lever 3 and the partner housing 21 are connected to each other by fitting the engagement protrusions 31*c* into the engagement recesses 21*c*.

The lever 3 is interposed between the connector 1 and the partner connector 2 and connects the connector 1 to the partner connector 2. The lever 3 includes a pair of arm sections 31 and a operating section 32, as shown in FIG. 1. Each of the arm sections 31 is formed from a plate member extending in the right-left direction Y, wherein the arm sections 31 are spaced from each other in the height direction Z with their plate surfaces being opposite to each other. Each of the arm sections 31 includes a boss attachment hole 31*a* and guide surfaces 31*b*, the boss attachment hole 31*a* extending through the arm section 31 in its thickness direction, wherein the guide surfaces 31*b* extend from an end of the boss attachment holes 31*a* on the forward side X1 toward the forward side X1 with being inclined in a direction in which the pair of arm sections 31 approach, i.e., in the height direction Z.

Each of the arm sections 31 includes an engagement protrusion 31*c* formed on a wall surface opposite to the guide surfaces 31*b*, the engagement protrusion 31*c* protruding from the wall surface in the height direction Z. The engagement protrusion 31*c* has a function of being connected to the partner connector 2 when mating the connector 1 with the partner connector 2, whereby the connector 1 and the partner connector 2 approach each other. The operating section 32 is formed in a plate shape extending in the height direction Z and connects ends of the pair of arm sections 31 on the right side Y2 to each other. The operating section 32 includes a latch claw 32*a* formed on an end edge of the operating section 32 on the forward side X1, the latch claw 32*a* protruding obliquely toward the rearward side X2.

Next, connection and fixing of the connector 1 and partner connector 2 will be described. For connecting the connector 1 to the partner connector 2, the lever 3 is first arranged on the connector 1 on the rearward side X2, as shown in FIG. 1. Furthermore, the partner connector 2 is arranged on the connector 1 on the forward side X1, as shown in FIG. 5. Then, the lever 3 and the partner connector 2 are each moved toward the connector 1 in the forward-rearward direction X.

During this movement, the lever 3 is moved toward the forward side X1 to the connector 1, wherein an arm section 31 of the pair of arm sections 31 on the upward side Z1 is inserted between an upper wall of the main body 121 of the housing 12 of the connector 1 and the upper wall of the hood section 122. On the other hand, an arm section 31 of the pair of arm sections 31 on the downward side Z2 is inserted between a lower wall of the main body 121 and the lower wall of the hood section 122. As each of the arm sections 31 is inserted into the housing 12, the bosses 125 of the housing 12 climb the respective guide surfaces 31*b* of the arm sections 31 so that the bosses 125 are guided by the guide surfaces 31*b* to be fitted into the boss attachment holes 31*a* (see FIG. 7). In this manner, the connector 1 and lever 3 are connected in such a manner that they are rotatable within a range defined by the boss attachment holes 31*a*.

On the other hand, the partner connector 2 is moved to the rearward side X2 toward the connector 1, wherein an opening edge of the partner connector 2 on the rearward side X2 is fitted into the mating space S in the connector 1. For this movement and fitting, the partner connector 2 is provided such that its opening edge is positioned between the main body 121 and the hood section 122 of the housing 12 of the connector 1. As the opening edge of the partner connector 2 is fitted between the main body 121 and the hood section 122, the engagement protrusions 31*c* of the lever 3 are fitted into the engagement recesses 21*c* in the partner connector 2 as described above, as shown in FIG. 7. In this manner, the partner connector 2 and the lever 3 are connected so as to be rotatable around the engagement protrusions 31*c*. The connector 1 is thus connected to the partner connector 2 with the lever 3 being interposed therebetween.

It is to be noted that in the state where the connector 1, partner connector 2 and lever 3 are connected, the lever 3 is rotatable in a direction as indicated by an arrow in FIG. 5. The lever is changeable between a non-latched state and a latched state by such rotation of the lever 3, wherein the latch claw 32*a* is not latched by the lever latch section 124 of the housing 12 in the non-latched state, and is latched by the lever latch section 124 in the latched state, as shown in FIG. 5.

Subsequently, when the partner housing 21 of the partner connector 2 is moved toward the housing 12 of the connector 1, the latching locks 123 of the housing 12 cross over the second lock sections 212 of the lock sections of the partner housing 21, as shown in FIG. 5. In this manner, the second lock sections 212 are latched by the latching locks 123. In this state, faces of the second lock sections 212 oriented toward the forward side X1 are in contact with faces of the latching locks 123 oriented toward the rearward side X2, whereby displacement of the partner connector 2 toward the forward side X1 is limited. The state as shown in FIG. 5 where the lever 3 is in the non-latched state and the second lock sections 212 are latched by the latching locks 123 shall be particularly referred to as a temporary assembled state.

Figure 6:
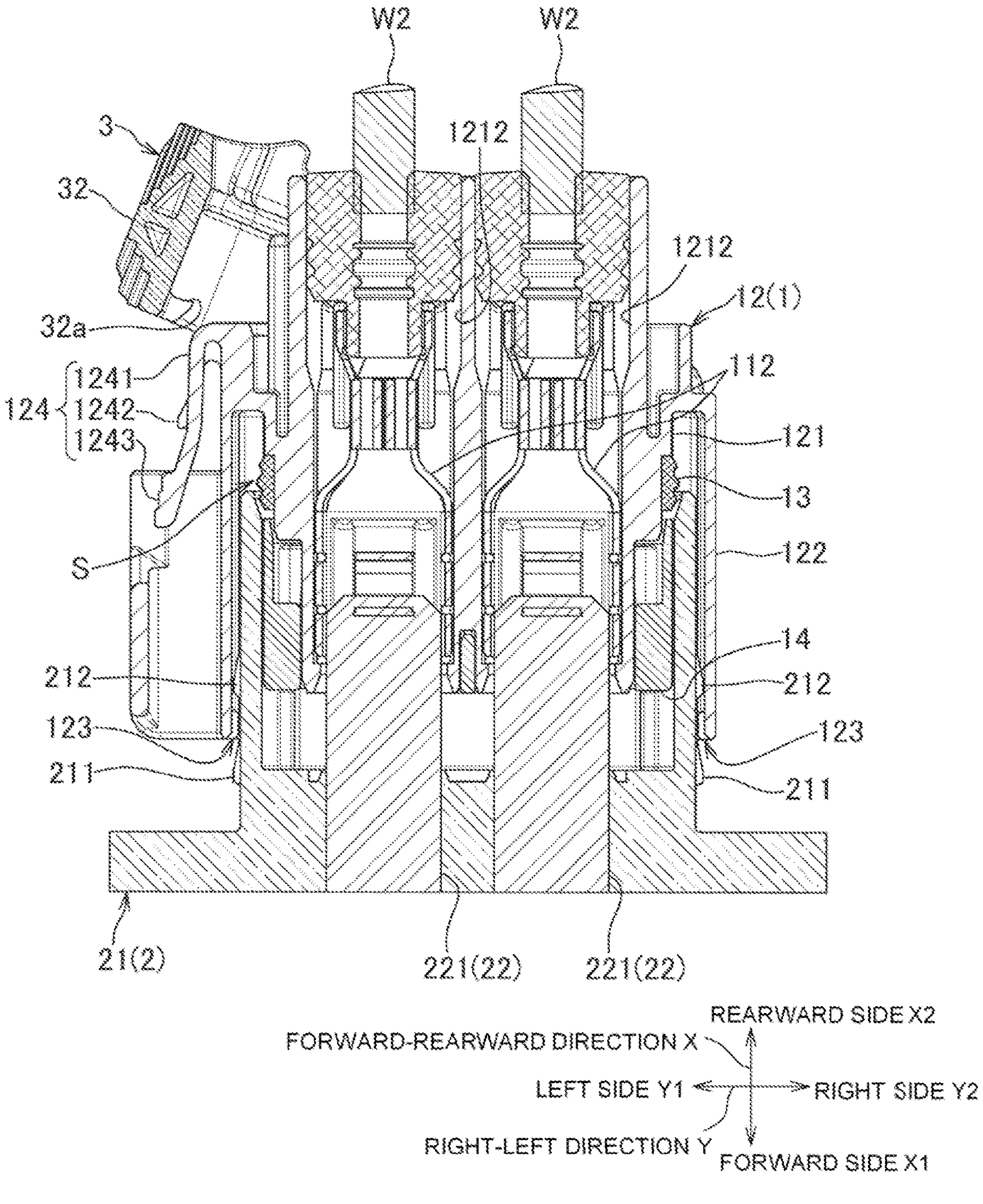
FIG. 6 shows a sectional view of the connector and partner connector in a transition state during change from the temporary assembled state into a final assembled state.

When rotating the operating section 32 of the lever 3 from the temporary assembled state, the entire lever 3 is rotated around a fulcrum in the form of the engagement protrusion 31*c* of the lever 3 engaged with the engagement recesses 21*c* in the partner housing 21. This rotation is accompanied by pressing the bosses 125 of the housing 12 with edges of the boss attachment holes 31*a* in the lever 3, as shown in FIG. 10. In this manner, the housing 12 is moved toward the partner connector 2 with a position of the partner housing 21 being fixed, as shown in FIG. 6.

Figure 8:
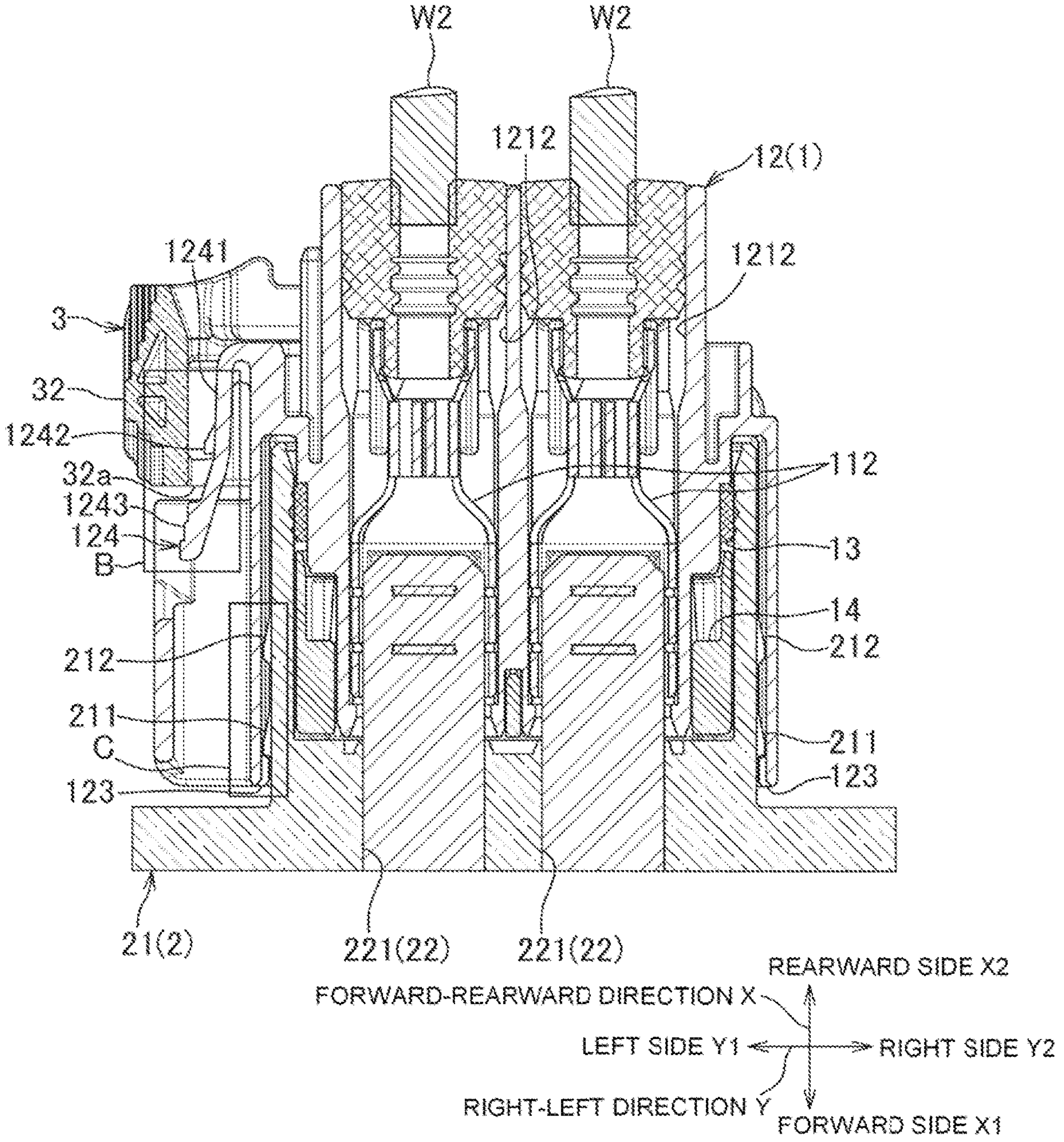
FIG. 8 shows a cross sectional view of the connector and partner connector in the final assembled state.
Figure 9A:
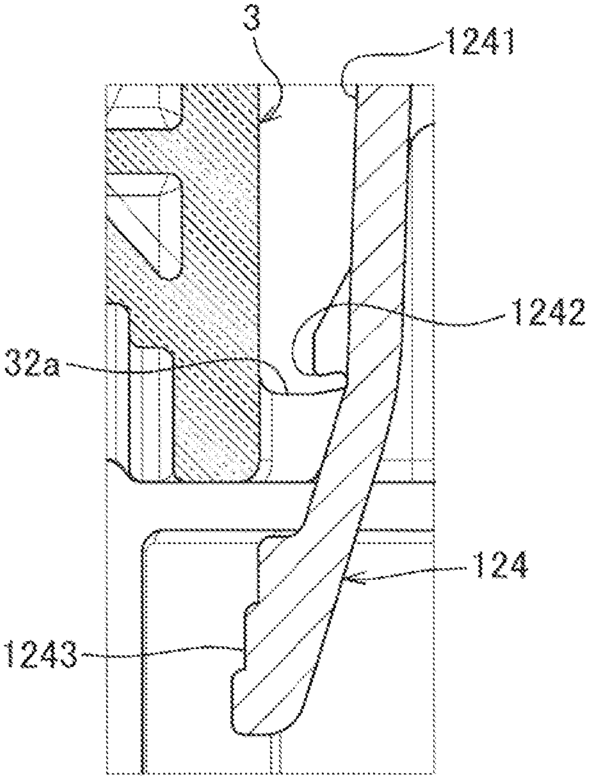
FIG. 9A shows a partial enlarged view of FIG. 8 in a region B.

After rotating the lever 3 completely, the lever 3 is latched by the lever latch section 124 of the housing 12, as shown in FIG. 8. In more details, the latch claw 32*a* of the lever 3 crosses over the claw portion 1242 of the lever latch section 124 and comes into contact with a region between the claw portion 1242 and the finger application portion 1243 of the lever latch section 124 to be supported by an elastic force of the lever latch section 124, as shown in FIG. 9A.

Figure 9B:
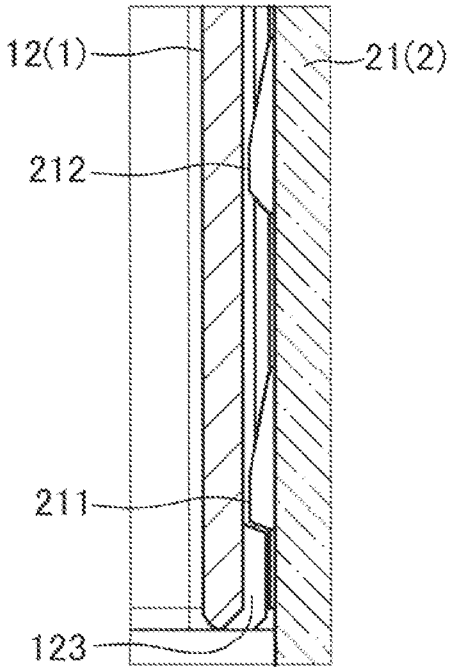
FIG. 9B shows a partial enlarged view of FIG. 8 in a region C.

Subsequently, from this state, the lever 3 is pressed further toward the lever latch section 124 or the partner housing 21 is pressed toward the housing 12, so that the housing 12 is moved still closer to the partner housing 21. During pressing the lever 3 or the partner housing 21, the latching locks 123 of the housing 12 cross over the lock sections 211 of the partner housing 21, as shown in FIGS. 8 and 9B. In this manner, the lock sections 211 are latched by the latching locks 123 to establish a final assembled state of the connector 1, the partner connector 2 and the lever 3. At this time, the pressed lever 3 returns back to a position in which it is supported by the lever latch section 124, which results in a clearance c between the boss attachment hole 31*a* and the boss 125, as shown in FIG. 10.

In order to release the final assembled state, the finger application portion 1243 of the lever latch section 124 is pressed inwardly in the right-left direction Y. In this manner, the lever 3 is not supported by the lever latch section 124, whereby the non-latched state is established in which the lever 3 is allowed to be rotated, wherein the fixed state of the connector 1 and the partner connector 2 is thus allowed to be released.

According to the above-described embodiment, the fixing structure includes the connector 1 and the partner connector 2 configured to be connected to the connector 1, and the lever 3 interposed between the connector 1 and the partner connector 2. The connector 1 includes the housing 12 having a tubular shape which is open along the forward-rearward direction X (fixing direction), the connector 1 and the partner connector 2 being configured to approach each other in the forward-rearward direction X. The housing 12 includes the latching locks 123 and the lever latch section 124, the latching locks 123 protruding in the right-left direction Y (intersection direction intersecting the fixing direction), the lever latch section 124 being independent from the latching locks 123 and configured to latch the lever 3. The partner connector 2 includes the partner housing 21 configured to be mated with the housing 12, wherein the partner housing 21 includes the lock sections 211 which are latchable by the latching locks 123. The lever 3 is changeable between a non-latched state and a latched state, wherein in the non-latched state, the lever 3 is configured not to be latched by the lever latch section 124, and in the latched state, the lever 3 is configured to be latched by the lever latch section 124, wherein when changing the lever 3 from the non-latched state to the latched state, the lever 3 connects the connector 1 to the partner connector 2 so as to cause the connector 1 and the partner connector 2 to approach each other in the forward-rearward direction X. The connector 1 is configured to be fixed to the partner connector 2 by the lever 3 being brought into the latched state and by the lock sections 211 being brought into a state in which the lock sections 211 is latched by the latching locks 123.

According to such configuration, the connector 1 and partner connector 2 are caused to approach each other in the forward-rearward direction X by the lever 3 changed from the non-latched state to the latched state. Then, the lever 3 in the latched state is latched by the lever latch section 124 of the connector 1 to maintain a pose of the lever 3, wherein maintaining the pose of the lever 3 enables the state to be maintained in which the connector 1 and partner connector 2 are close to each other in the forward-rearward direction X. In addition thereto, the lock sections 211 of the partner connector 2 is latched by the latching locks 123 on the housing 12 of the connector 1 independently from the lever 3, wherein by bringing the connector 1 and the partner connector 2 into this state, the connector 1 is fixed to the partner connector 2. In this manner, it is possible to stably maintain the fixed state of the connector 1 and the partner connector 2 without relying only on the lever 3. Even in the case where a dimension of the lever 3 and/or the lever latch section 124 varies largely and assembling instability is thus caused between the lever 3 and lever latch section 124, it is therefore possible to reduce the resulting impact. Furthermore, the latching locks 123 are independent from the lever latch section 124, and therefore, the latching locks 123 is prevented from being touched by a hand of an operator when operating the lever 3, which suppresses interference of the operator with latching the latching locks 123 and the lock sections 211. In this manner, it is possible to stably maintain the fixed state of the connector 1 and the partner connector 2. Thus, it is possible to provide a fixing structure which enables a correct contact state between terminals of a connector 1 and a partner connector 2 to be maintained stably.

Furthermore, according to the present embodiment, the second lock sections 212 of the partner connector 2 may be latched by the latching locks 123 of the connector 1 to establish the temporary assembled state. Therefore, it is possible to bring the lever 3 from the non-latched state into the latched state with the partner connector 2 and the connector 1 being positioned. In this manner, it is possible to establish the temporary assembled state before the final assembled state, which enables operation of the lever 3 and latching the latching locks 123 to the lock sections 211 to be accomplished in a more stable manner. Moreover, it is possible to use the latching locks 123 to latch the second lock sections 212 for establishing the temporary assembled state as well as to latch the lock sections 211 for establishing the final assembled state. This means that the latching locks 123 can be shared by the lock sections 211 and the second lock sections 212, which enables the latching locks 123 to be structurally simplified correspondingly.

Moreover, according to the present embodiment, a pair of lock sections 211 and a pair of second lock sections 212 are provided on both sides of the partner housing 21 in the right-left direction Y (on both opposite sides in the width direction). This enables the fixed state of the connector 1 and the partner connector 2 to be more firmly maintained in the temporary assembled state as well as in the final assembled state, as compared with configuration without a pair of lock sections 211 and a pair of second lock sections 212.

Although embodiments of the fixing structure have been described with reference with the Drawings, specific embodiments of the present invention are not limited to the above embodiments, but the present invention includes e.g. design modifications which do not depart from the spirit and core of the present invention. For example, the above embodiment is provided such that after bringing the lever 3 into the latched state, the lever 3 is pressed further toward the lever latch section 124 or the partner housing 21 is pressed toward the housing 12 in order to establish the final assembled state. However, the final assembled state may be established simultaneously at the time of bringing the lever 3 into the latched state. In this case, by haptically perceiving that the latch claw 32*a* of the lever 3 has crossed over the claw portion 1242 of the lever latch section 124, an operator operating the lever 3 can recognize that the connector 1 and the partner connector 2 have been assembled completely. Thus, it is preferably possible to recognize completion of assembly by haptically perceiving the lever 3.

However, in the above embodiment, after being pressed for establishing the final assembled state, the lever 3 is returned back to the pose before pressing, which can generate the clearance c as described above. Even in the case where impact and/or vibration is applied to the lever 3 and/or lever latch section 124, existence of this clearance c makes it difficult to affect the connector 1 via the bosses 125 by the impact/vibration. Moreover, even in the case where a dimension of the lever 3 and/or lever latch section 124 varies and assembling instability is thus caused between the lever 3 and lever latch section 124, it is difficult to affect the connector 1 via the bosses 125 by the variation and/or assembling instability. Therefore, the clearance c is preferably provided like the above embodiment, from the viewpoint of stably maintaining the final assembled state.

REFERENCE SIGNS LIST

X Forward-rearward direction (fixing direction)
Y Right-left direction (intersection direction)
1 Connector
12 Housing
123 Latching locks
124 Lever latch section
2 Partner connector
21 Partner housing
211 Lock sections
3 Lever

What is claimed is:

1. A fixing structure comprising:
a connector;
a partner connector configured to be connected to the connector; and
a lever interposed between the connector and the partner connector,
wherein the connector includes a housing having a tubular shape which is open along a fixing direction, the connector and the partner connector being configured to approach each other in the fixing direction,
wherein the housing includes a latching lock and a lever latch section, the latching lock protruding in an intersection direction intersecting the fixing direction, the lever latch section being independent from the latching lock and configured to latch the lever,
wherein the partner connector includes a partner housing configured to be mated with the housing,
wherein the partner housing includes a lock section which is latchable by the latching lock,
wherein the lever is changeable between a non-latched state and a latched state,
wherein in the non-latched state, the lever is configured not to be latched by the lever latch section, and in the latched state, the lever is configured to be latched by the lever latch section,
wherein when changing the lever from the non-latched state to the latched state, the lever connects the connector to the partner connector so as to cause the connector and the partner connector to approach each other in the fixing direction,
wherein the connector is configured to be fixed to the partner connector by the lever being brought into the latched state and by the lock section being brought into a state in which the lock section is latched by the latching lock.

2. The fixing structure according to claim 1,
wherein the partner connector includes a second lock section which is spaced from the lock section toward the connector in the fixing direction,
wherein in the non-latched state of the lever, the second lock section is configured to be latched by the latching lock to establish a temporary assembled state, and
wherein in the latched state of the lever, the lock section is configured to be latched by the latching lock to establish a final assembled state.

3. The fixing structure according to claim 2,
wherein the fixing direction is a forward-rearward direction of the housing and the partner housing,
wherein the intersection direction is a width direction of the housing and the partner housing,
wherein a pair of lock sections and a pair of second lock sections are provided, and
wherein one of the pair of lock sections and one of the pair of second lock sections are provided on one side along the width direction, and another of the pair of lock sections and another of the pair of second lock sections are provided on another side along the width direction.

* * * * *